(12) United States Patent
Marr (10) Patent No.: US 7,444,677 B2
(45) Date of Patent: Oct. 28, 2008

(54) INTENTIONAL CASCADE FAILURE

(75) Inventor: Michael David Marr, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 782 days.

(21) Appl. No.: 10/794,229

(22) Filed: Mar. 5, 2004

(65) Prior Publication Data

US 2005/0198516 A1 Sep. 8, 2005

(51) Int. Cl.
*G06F 11/00* (2006.01)
(52) U.S. Cl. ............................ 726/22; 726/23; 726/24; 726/26; 713/187; 713/188; 717/106
(58) Field of Classification Search ................ 713/187, 713/188, 189; 726/22, 24, 26; 717/106, 717/136
See application file for complete search history.

(56) References Cited

U.S. PATENT DOCUMENTS

| | | | | | |
|---|---|---|---|---|---|
| 5,583,988 | A | * | 12/1996 | Crank et al. | 714/48 |
| 5,907,709 | A | * | 5/1999 | Cantey et al. | 717/141 |
| 6,006,328 | A | * | 12/1999 | Drake | 726/23 |
| 6,178,509 | B1 | * | 1/2001 | Nardone et al. | 726/22 |
| 6,779,114 | B1 | * | 8/2004 | Chow et al. | 713/189 |
| 7,051,200 | B1 | * | 5/2006 | Manferdelli et al. | 713/153 |
| 7,080,257 | B1 | * | 7/2006 | Jakubowski et al. | 713/187 |
| 7,287,166 | B1 | * | 10/2007 | Chang et al. | 713/187 |
| 7,383,583 | B2 | * | 6/2008 | Marr et al. | 726/26 |
| 2002/0073323 | A1 | * | 6/2002 | Jordan | 713/188 |
| 2003/0018906 | A1 | * | 1/2003 | Smith et al. | 713/189 |
| 2005/0198526 | A1 | * | 9/2005 | Marr et al. | 713/200 |
| 2005/0198645 | A1 | * | 9/2005 | Marr et al. | 719/310 |

OTHER PUBLICATIONS

Aucsmith, D., "Tamper Resistant Software: An Implementation", *Proceedings 1st International Information Hiding Workshop* (IHW), Cambridge, U.K. 1996, Springer LNCS 1174, 1997, 317-333.

Horne, B. et al., "Dynamic Self-Checking Techniques for Improved Tamper Resistance", *Proceedings 1st ACM Workshop on Digital Rights Management*(DRM2001), Springer LNCS 2320, 2002, 141-159.

Chinchani, R. et al., "A Tamper-Resistant Framework for Unambiguous Detection of Attacks in User Space Using Process Monitors", *1st IEEE Workshop on Information Assurance*, Mar. 2003, Germany, 10 Pages.

US 5,748,741, 05/1998, Johnson et al. (withdrawn)*

* cited by examiner

*Primary Examiner*—Nasser Moazzami
*Assistant Examiner*—Shanto M Abedin
(74) *Attorney, Agent, or Firm*—Woodcock Washburn LLP (57) ABSTRACT

Additional code is added to sensitive code in order to foil an adversary attempting to examine or modify the sensitive code. The additional code implements a cascade failure system. In the cascade failure system an intrusion is detected by an authorization check, and when an intrusion is detected, further changes are made which will trigger failures of other authorization checks or cause corruptions to the internal execution state of the program. Eventually, the changes will trigger a complete failure of the code to run correctly, however the genesis of the cascading failure will be concealed, so an adversary will not be able to determine how the intrusion was initially detected. The insertion of the additional cascade failure system code can be performed automatically by a mechanism with some random components, and thus the locations and content of the inserted code may be different for each instance of sensitive code into which a content failure system has been inserted.

9 Claims, 4 Drawing Sheets

INTENTIONAL CASCADE FAILURE

FIELD OF THE INVENTION

The present invention relates generally to the field of computing, and, more particularly, to preventing examination or manipulation of specific code through cascading failures.

BACKGROUND OF THE INVENTION

Generally, computer applications run by executing object code. The object code controls the actions of the computer systems on which it is run. Such code may be made public or otherwise made accessible by its authors, for example by publishing the original source code that was compiled to create the object code. The original authors may also choose to make the code more usable by other programmers by including "debug symbols" which are data files which help to describe the structure of the object code so that users of the code can debug their own programs. However, for some uses, it is advisable to protect code from examination by possible adversaries. For example, where the code represents the best available implementation of a particular algorithm, the code itself may represent a trade secret. In another example, where code is used to secure content, it may be useful to protect the code in order to ensure the security of the content from an adversary. Maintaining the security of content may be useful in many contexts. One such context is where the content is private information, for example, financial information about a computer user, user passwords, or other personal information. Another context in which maintaining the security of content is useful is when the secure content is content which is to be used only in a limited way. For example, copyrighted content may be protected by requiring a license for use.

License provisions may be enforced for secure content by a digital rights management (DRM) application. In some DRM applications, content is stored only in an encrypted form, and then decrypted for use according to an electronic license which defines the specific user's rights to use the content. Some or all of the code and associated decryption data which decrypts the encrypted content is therefore protected, because if this code which accesses the copyrighted context is compromised, it may be possible to access the copyright outside of the bounds of the electronic license, for unlicensed uses.

Code which protects sensitive information or performs other sensitive operations is, in some contexts, referred to as a "black box." The black box may include hardware elements along with software elements. When a black box (or other sensitive code) is being used on a computer system, an adversary may use several means in order to attempt to compromise the security of the operations of the black box. For example, an adversary may attempt to trace the code running in the black box. One way in which an adversary may attempt to do this is by using a debugger to track the progress of the code. Another way an adversary may attempt to compromise the security of the black box is by making modifications to the code in order to provide access to the secure content to the adversary.

In order to prevent such attacks, adversarial detection measures may be used. These measures detect adversarial attacks and cause the black box (or other sensitive code) to cease functioning, so as to prevent the attack from continuing and discovering sensitive information. One such detection measure is caller verification. In a complex software application, one portion of code may call on the functionality of other portions of code. When a secure function or other piece of sensitive code is called by some outside caller, it receives caller identity data concerning the identity of the caller. The secure function will only execute if the caller has the correct security or trustedness. However, the caller identity data which identifies the supposed caller to the secure function may be manipulated. An adversary may take advantage of this in order to hide a call to the secure function by an unauthorized caller. A technique known as caller verification can be used to ensure that the caller identity data does, in fact, identify the correct caller. If a situation is detected in which caller verification has failed, the code halts.

Other measures identify that code has been tampered with or that a debugger is being used. For example, a check may be performed to detect that some portion of memory storing code or data associated with code has been modified. A breakpoint check may be performed to determine if breakpoints have been inserted into the code. Such breakpoints are used to allow an adversary to debug the sensitive code. When measures such as these are used, upon detection of an attack, execution of the sensitive code halts.

However, these measures provide the attacking adversary with some information which may be useful in future attacks. That is, when an adversary detects that a mechanism of attack has caused a failure, the adversary gains a foothold in planning a new attack—the adversary can determine what caused the failure and can attempt to avoid causing such a failure with the adversary's next attack.

For example, the code may include statements corresponding to the following pseudocode:

```
Perform adversary_detect_measure
If adversary_detect_measure = true then fail
```

If this code is found, it may be clear that this is an adversary detection measure. The pattern of the code may provide this information even if the attack detection measure is named "check301" rather than "adversary_detect_measure." It will then be obvious to an adversary that the check must be circumvented in order to prevent the code from halting. If the adversary discovers this, or if the adversary notes that this is where the code halts when the adversary has launched a certain kind of attack, the adversary may add bypassing code. Among many possible bypassing solutions, this may, for example, leave the code in the state corresponding to the following pseudocode:

```
Jump to Bypass
Perform adversary_detect_measure
If adversary_detect_measure = true then fail
Bypass
```

In this way, the detection measure may be circumvented.

In view of the foregoing, there is a need for a system that overcomes the drawbacks of the prior art.

SUMMARY OF THE INVENTION

The present invention helps to prevent a code module from being used in an unauthorized manner, or under inappropriate circumstances. The invention operates by providing an incremental cascading failure upon the detection of an attack by a security measure which conceals the security measure which detected the attack.

The invention provides a method of protecting sensitive code, by inserting into the sensitive code a first insertion which detects whether an unauthorized action is occurring and, if it is, changes a first state of the computing environment. This change in a first state of the computing environment, triggers a second insertion with a second authorization check to detect that an unauthorized action has occurred. A chain of such detections and changes may occur, leading to an eventual incorrect functioning of the sensitive code, possibly resulting in a halt to execution.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

In order to protect sensitive code from attack, security measures may be implemented which detect an attack and cause a failure which halts the correct execution of the sensitive code. In order to further hinder an adversary, the present invention provides methods and systems which conceal the failure point while still ensuring that the execution of the sensitive code stops executing correctly or halts.

In one embodiment, the concealment is accomplished by inserting cascade triggers in the code. Each cascade trigger, when a failure is detected, propagates the cascade by corrupting the execution environment or by emulating an additional unauthorized action in the computing environment, or both. Eventually, the process will stop executing correctly; however, because of the cascading of failures, it will be difficult to detect the initial failure which caused the cascade failure to begin.

Exemplary Computing Arrangement

Figure 1:
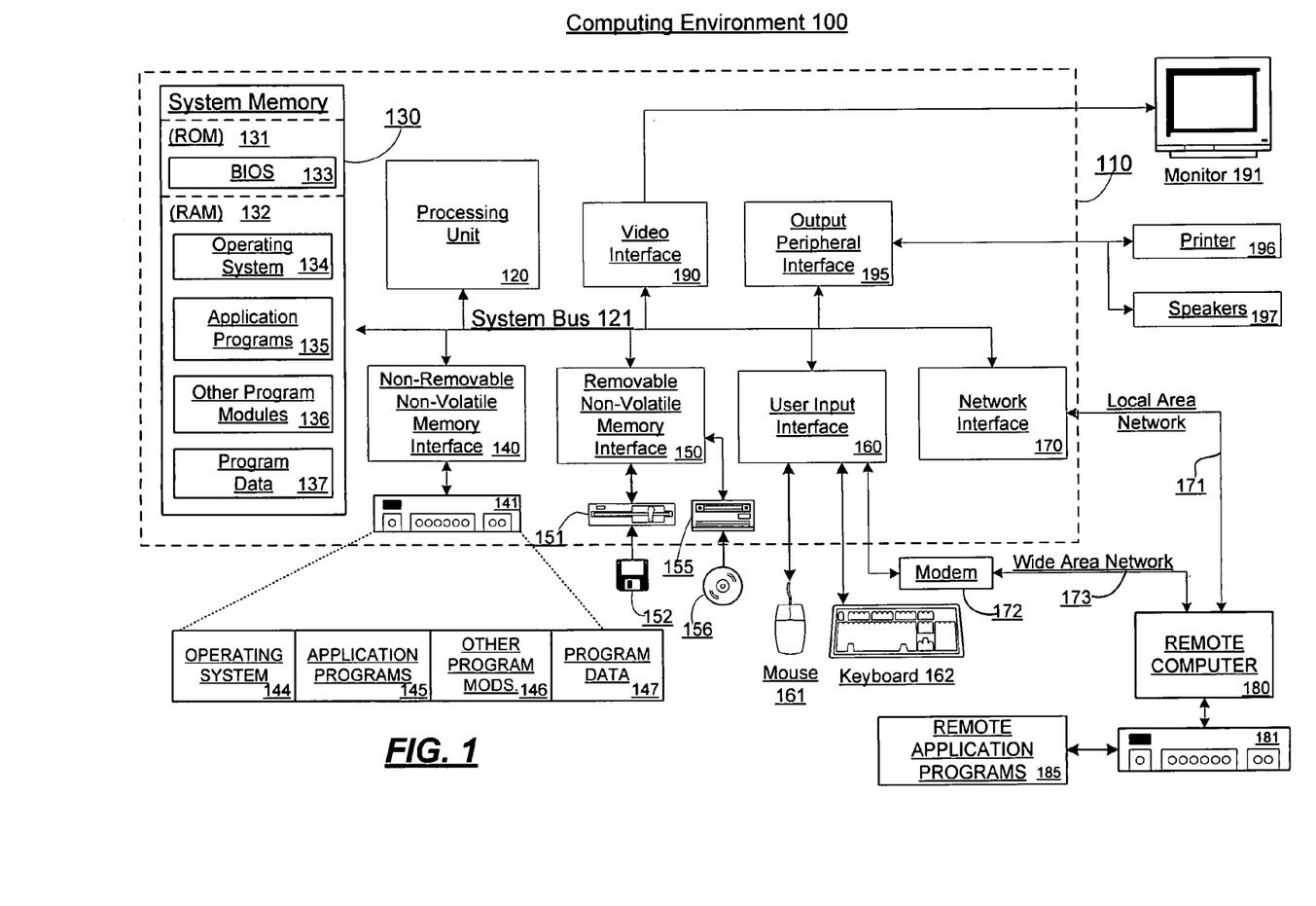
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Cascade Failures

In one embodiment, in order to provide for increased security in sensitive code, in various locations in the sensitive code, additional code is inserted into the original sensitive code. The additional code implements a cascade failure system. In some locations, the cascade failure system code performs an authorization check. This authorization check is performed to detect some unauthorized action of an adversary. If, during the authorization check, an unauthorized action is encountered, then a cascade failure is initiated. The initiation of a cascade failure causes a chain reaction which endeavors to corrupt internal state surreptitiously.

Cascade failure occurs through the execution of one or more cascade triggers. A cascade trigger is an action or inaction which, while not necessarily immediately causing a failure, leads to further actions or inactions which will eventually cause the code to become inoperable. When an authorization check is failed, one or more cascade triggers may occur. These cascade triggers action or inaction may also be the cause of an additional failure of an authorization check. Cascade triggers may also lead to a condition which halts the correct execution of the code.

For example, upon detection of a failed authorization, a cascade trigger may be set which changes the value stored in a given location in memory. This location in memory may store information necessary for the normal operation of the code in which the cascade trigger has been inserted. In such a case, some later activity of the code may yield improper results or cease normal functioning. Additionally, an authorization check (for example, an authorization check which performs memory page verification to determine whether memory has been changed) may detect the change and treat it is a direct modification by an adversary, triggering its own cascade failures. The location in memory, however, may also be a location used only by the cascade failure system.

Another possibility is to insert a cascade trigger where, for example, decryption of a page of memory is required for the application to function properly. In such a case, upon detection of a failed authorization check, the decryption of the page of memory will not occur, while where the authorization check is successful, the page of memory is decrypted. When the required page is used, then, the presence of the correct, unencrypted data will be dependent on whether the authorization check has been passed. This will cause the code to halt or otherwise fail to produce the intended calculation. Thus, the cascade trigger causes a change in the state of the computing environment by forestalling an event (the decryption of the page). This is an example where the cascade trigger causes a change in the state of the computing environment through causing inaction rather than through an action.

Where, for example, code halts because a certain page of memory caused an irresolvable problem, an adversary may be able to determine that the page caused a failure. However, it may not be clear why the page was not correct. In addition, if the adversary does determine that the page was incorrect due to an authorization check failure, the authorization check may have failed because of a condition induced by the failure of a previous authorization check that initiated or simply further propagated a cascade failure. That is, at the point where the system corruptions are advanced enough that the adversary can notice them, determining what initiated the cascade is difficult. Therefore, the process of designing further adversarial countermeasures is significantly complicated and the sensitive code is made resistant to reverse engineering.

In one embodiment, two primary cascade triggers are (1) direct memory modifications and (2) corruptions to the run-time environment of the program, such as consuming massive amounts of operating system resource like CPU time (for example, via thread spawning), memory, file handles, etc.

Memory modifications are made to memory locations spread throughout the code and data segments of the binary, the program stack, and the heap. Such memory modifications may cause the code to fail to execute correctly or to halt due to exceptions or corruptions to calculations, where the memory modification is made to a location which is in use during normal execution of the code.

In addition, such memory modifications may cause further authorization checks to be failed. Such authorization checks may be based on values stored in memory locations used in the course of normal execution of the code or in memory locations only used by the cascade failure system. Where a cascade trigger causes a change to a memory location, a complementary authorization check may check the value stored in that memory location. This may be done by simply determining whether the value stored in the memory location is the value which is expected to be in that memory location. However, more subtle authorization checks may be performed instead, which may be less obvious to an adversary. For example, the data stored in the memory location may be used implicitly in a calculation. For example, an authorization check may be composed of the XOR result of values from two memory locations where the result is used directly as part of a decryption key, or may be the addition of two memory locations where the carry bit is used to decide the result of a branch.

Cascade Failure Process

Figure 2:
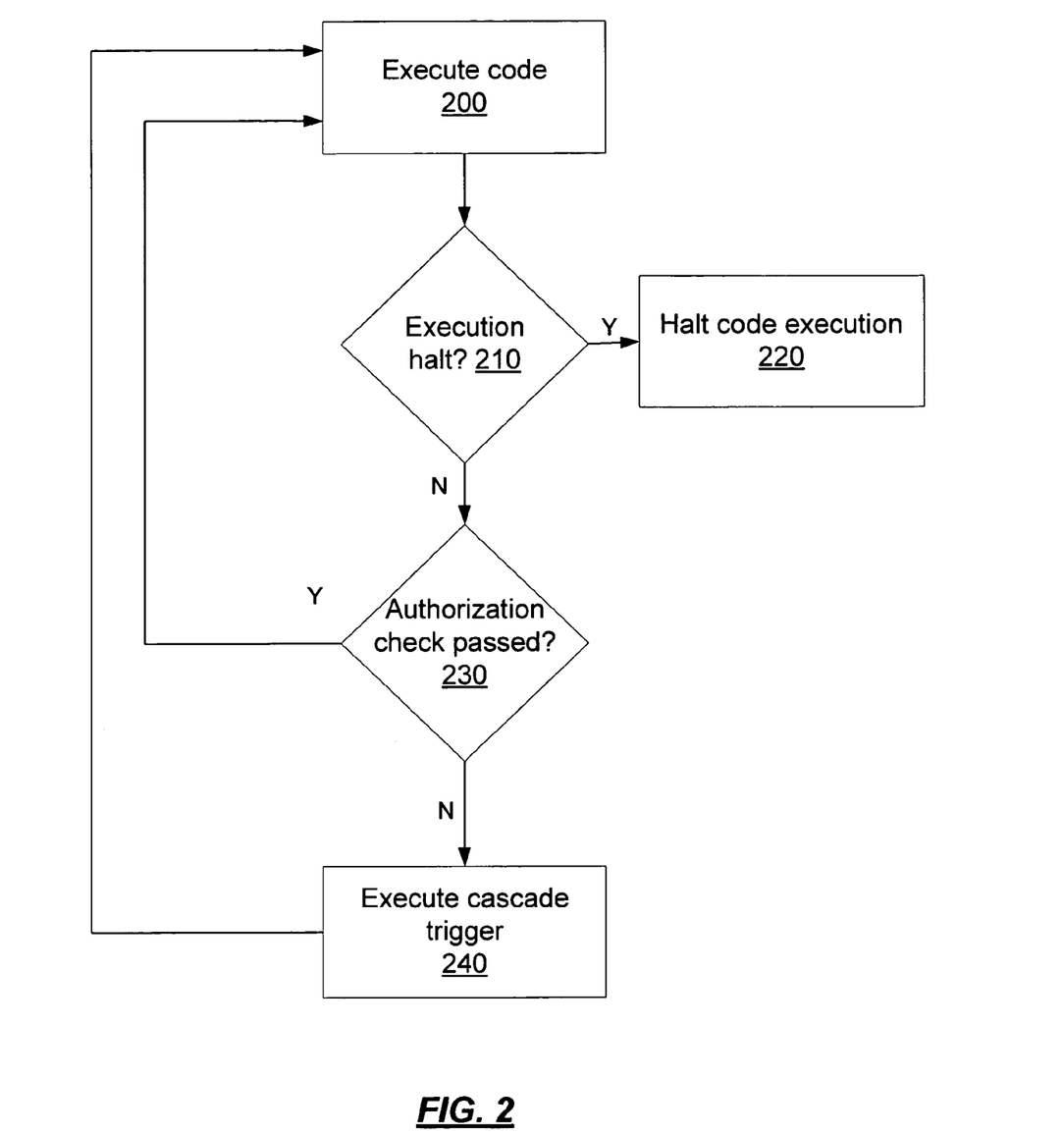
FIG. 2 is a flow diagram of execution of sensitive code with a cascade failure system inserted according to one embodiment of the invention.

The cascade failure process occurs as shown in FIG. 2. FIG. 2 describes the execution of sensitive code with a cascade failure system inserted.

As shown in FIG. 2, in step 200, the code begins execution. At any time, the code execution may encounter a halt in execution, as shown in step 210. This may occur due to a normal end to execution, such as when a task has been completed by the sensitive code. This may also occur due to corruptions to the system, for example, corruptions created by a cascade trigger, in an abnormal end to execution.

If this occurs, step 220, code execution halts. If this does not occur, an authorization check may be encountered. When an authorization check is encountered, in step 230, if the execution check is passed, the code continues executing with step 200. If the execution check is not passed, a cascade trigger occurs, in step 240. As described, such a cascade trigger changes the state of the computing environment in a way which can lead to the failure of other authorization checks or in a way which can eventually cause an abnormal halt in execution. After the cascade trigger is executed, the code continues to execute, with step 200.

It is contemplated that, if an authorization check is failed, several additional code authorization failures will occur, and cascade triggers will be executed, after which the code will stop executing correctly or will abnormally halt. In an alternate embodiment, a cascade trigger may be included which immediately halts the code. In such a case, again, it is contemplated that such a halt due to a cascade trigger can occur at the end of a chain of cascade failures, and therefore the initial cause of the cascade failure will be difficult for an adversary to discern. That is, the final intentional halt to execution may be in response to an authorization failure caused by a cascade of induced corruptions.

Additional Decoy Code

Additional code may be added to both hide the cascade failure system and amplify its efficiency at corrupting the system state. Decoy code is code additions which perform actions which in actuality have no significance or effect on the execution of the sensitive code, but which appear to making significant calculations as part of the sensitive code. It thereby helps to camouflage the cascade failure system by providing additional references to memory locations used exclusively by the failure system. That is, if a location in memory is only used in the cascade failure system, an adversary may determine this by noting that the values are not often used or that they are used only at particular times or locations. In order to confuse the adversary, decoy code is added to hide important memory references amidst numerous decoy references.

For example, suppose two memory locations are only used by the authorization system, and the only time that they are ever used for cascade failure is by performing an XOR on the values stored in the two locations. Additional decoy code can be added in other locations of the code which exchange the values stored in the two memory locations. This will not change the result of the example authorization check because XOR is a commutative operation. That is, swapping the data stored at the two locations simply provides additional memory references to the two locations elsewhere in the system.

Additionally, suppose that some functionality in code which has been dormant starts to become operational, because of a cascade trigger. Such dormant functionality, when "awakened" or enabled, begins using only one of the values described in the preceding example—i.e. a calculation is now performed by the code such that it does not XOR the two locations before using the result (or perform an equivalent commutative operation with respect to the two data locations). The location of which data is stored in which location becomes significant, and the decoy code has now helped amplify the behavior of the cascade trigger which enabled the dormant code. For example, the previously dormant code may behave normally when Data A is in Location A, but corrupt memory when Data A is in Location B. Therefore, the decoy swaps which were innocuous before will begin causing sporadic memory corruptions after a cascade trigger enabled the corruption code.

Thus, decoy code can induce propagation of an error to other parts of the system in addition to providing camouflage for the cascade triggers. In another example, if a value in a memory location A is always known to be zero except when a cascade trigger changes the value to non-zero, adding A to any other memory location B will not change the value of B unless A becomes non-zero. In this way, decoy code like this adding example can be inserted anywhere in the code in order to produce references to A and B, and which produce no effect on the execution of the system up until a cascade trigger modifies A to be non-zero. At that point, B (and any other similarly manipulated memory location) become corrupted by the heretofore innocuous decoy code containing add operations involving A. Like a cascade trigger, this may cause the system execution to proceed incorrectly or to halt, or it may cause other authorization checks involving B to fail. The cascade failure that was initiated by an earlier cascade trigger (in this example, changing A to be non-zero) was amplified into numerous corruptions by several decoy code snippets spread throughout the system, one of which involved B.

The add and XOR examples in the preceding paragraphs are trivial examples of calculations that can be used, but are in no way to be construed as limiting the types of operations that can be used. Indeed, any calculation based on logical or number theoretic tautologies can be used in the decoy code to produce operations that perform innocuous calculations before a cascade failure is triggered, but which negatively perturb system state after a trigger occurs.

For example, these operations can involve one calculation like the A+B example above, two operations like encrypting a code segment and then decrypting it at a later time but before the system attempts to execute the code, or multi-step operations that don't even involve inverse calculations. For example, we could take a value A representing a two's complement integer and multiply it by B, add C, and then right shift it by D. If, for example, B is 2, C is 1, D is 1 and A is known to be an even number less than half the size representable by the memory location, then A will be returned to its initial value. In one of A, B, C or D can be modified by a cascade trigger to cause this multi-step decoy to propagate the cascade failure. Furthermore, each of the parts of this multi-step calculation can be separated by calculations relevant to the sensitive code being protected, so do not even require consecutive instruction execution.

Adding a Cascade Failure System to Unique Instances of Sensitive Code

Depending on the sensitivity of code, different versions or instances may be separately created. For example, when a black box is used for each individual user of a black box, each instance of these black boxes is unique. Additionally, where code is sensitive and subject to attack, it may be preferable to build, for example, 100 different versions of the sensitive code, and to distribute these randomly. Thus, if one of these versions is compromised, 99% of the users of the sensitive code are not imperiled.

In such cases, cascade failure systems may also be separately inserted into each unique instance of the sensitive code. Thus, instead of a deterministic insertion of the cascade failure system code, the cascade failure system may be randomly injected into the sensitive code. Both the location of the insertions of cascade failure system code and what each location comprises may be random.

For example, in one unique instance of sensitive code, the first piece of cascade failure system code may include additional obfuscation code. In a second unique instance of sensitive code, the first piece of cascade failure system code may be a memory page authorization check. The number of cascade triggers or decoy locations can be varied in the two versions. These insertions, though they are each the first in their unique instances of sensitive code, may also be at very different locations in the sensitive code. Thus, the object code "fingerprint" of the cascade failure system in each unique instance of the sensitive code is different, and if reverse engineering successfully determines what the cascade failure system looks like in one instance of the sensitive code, this does not necessarily advantage an adversary in determining how to disable or otherwise subvert the cascade failure system in a second instance of the sensitive code. Moreover, the sensitive code in which the failure code is inserted necessarily also has a unique "fingerprint" because the unique code is embedded in it, and so is similarly resistant to reverse engineering techniques which attempt to perform object code recurrence analysis.

Cascade Triggers

In one embodiment, several cascade triggers are used in order to cause cascading failures and progressively disable the functioning of the sensitive code. Examples of such possible cascade triggers are:

MemFail—As discussed above, certain locations in memory are deleted or changed in order to cause problems in execution and to trigger successive memory page authorization check failures. This may be a StackFail, HeapFail, CodeFail or DataFail.

StackFail—This cascade trigger overwrites program stack memory. For example, this can cause corruptions to local stack variables, machine registers and other processor state, or return addresses of caller functions. This can cause subsequent calculations to become corrupt in ostensibly random ways, making the source of the incorrect calculation difficult to reverse engineer.

HeapFail—Run time environments that track heap allocations, for example by implementing their own heap memory manager, can overwrite heap memory bytes. Since heap memory is used for storing data and code for a variety of disparate purposes, corruptions to the heap allocations or heap manager data structures can cause sporadic failures in system execution. For example, these failures can include access violations caused by dereferencing illegal pointers, illegal instruction failures from jumping execution into illegal code memory, other hardware exceptions like divide by zero, or corrupted calculations like garbled decryptions when an encryption table or key is modified.

CodeFail—This failure changes bytes in the pages which are used to store the code being executed. The machine instructions become different, which can result in anything from an illegal instruction exception to a subtly perturbed calculation that corrupts future calculations. For example, an add becomes a subtract or a jump to an instruction 20 bytes hence becomes a jump of only 15 bytes to the previous instruction.

DataFail—This failure will overwrite memory associated with the data sections of the executable binary. For example, these data sections may store program global variables, import and export function address tables used by the operating system for applications composed of multiple binaries, and other function pointer tables like C++-style v-tables.

CRTFail—This cascade trigger introduces changes to the C runtime library. For applications written in C or C++, the C runtime library is an API (application programmer interface) used when loading executables, managing memory, performing floating point math, and other common operations required by typical applications. One way to further hide the cascade failure system is to introduce changes which mimic commonly-found bugs in an application's use of an API. For example, a common mistake in application software is to forget to release memory after using it, which causes the application to behave badly after running for a while. A cascade trigger might try to mimic this bug by intentionally allocating memory that it does not release, encouraging an adversary to dismiss the behavior as a common bug rather than as part of the protection system. If such changes to the C runtime library cause the application to execute improperly or halt, the adversary may not even recognize that the problem was due to the attack, rather than due to a bug present in the system the adversary is attacking.

APIFail—This cascade trigger introduces a general Win32 API error similar to the CRTFail. Again, the error may be created to mimic commonly-made mistakes when using an API. These calls can also be used to hide the important calls to external Win32 API functions amongst calls which are designed to corrupt the system. That is, if the black box uses certain Win32 functions for sensitive operations, it may be advantageous to make many calls to the same Win32 functions to help camouflage which are the important calls.

HealObfFail—In certain cases, code in the sensitive code may be obfuscated when it is loaded, which may include sparse changes to individual instructions or complete cryptographic encryption of entire code sections. Such code will not run correctly until the obfuscation is corrected which may be done only immediately before the code is run. If such corrections ("unobfuscations") do not occur, the code will not run correctly. Certain HealObfFail cascade triggers will cause the healing of obfuscations to fail. Because the code is unchanged, an adversary may not realize that the obfuscation in the code is deliberate. This is an example of an inaction (failure to "heal" the obfuscation) which can trigger further cascading failures, problems with proper execution, or a halting of the code. Other HealObfFail triggers may attempt to apply the "healing" modifications to already correct code, which will have the effect of corrupting the code instead.

Additionally, cascade triggers which cause changes in the computing environment which have no effect on the performance of the sensitive code may be implemented. Such cascade triggers may be matched with one or more authorization checks which check for these changes.

For example, a crossbar of values (a number of locations in memory) which are not referenced by the sensitive code initially holds all zeros. A cascade trigger which changes a value in the crossbar of values from zero to one may seem innocuous to an adversary. However, this may be matched with an authorization check which adds all the values in the crossbar and fails if the sum is different than expected. Such authorization check, upon failure, will trigger additional cascade triggers, some of which may interfere with the execution of the sensitive code to a greater extent. As discussed above, decoy code may also be inserted which performs actions on the crossbar which do not affect whether authorization checks are passed or failed until a cascade trigger modifies the crossbar. For example, the values in two locations on the crossbar may be switched or added together with the result stored elsewhere on the crossbar. If the crossbar has not been changed, these changes in decoy code will not have any effect; however, if the crossbar has been changed by a cascade trigger, the decoy code may propagate or amplify changes created due to an earlier cascade failure affecting the crossbar values.

Insertion of Cascade Failure System Code

Cascade failure system code is inserted into the sensitive code being protected by the cascade failure system. In one embodiment, code snippets are inserted according to the following grammar, with insertions being added throughout the code:

| | |
|---|---|
| Insertion: | InsertionCode \| [null] |
| InsertionCode: | DecoyCode \| CFSInsert |
| CFSInsert: | (Cascadecheck)$^n$ |
| CascadeCheck: | if (AuthorizationCheck) (CascadeTrigger)$^m$ |
| CascadeTrigger: | MemFail \| CRTFail \| APIFail \| HealObfFail |
| MemFail: | StackFail \| HeapFail \| CodeFail \| DataFail |

An Insertion, according to the grammar, is placed into the code in several locations. The Insertion will resolve, according to the grammar, into either InsertionCode or into no code ([null]). This resolution (and other such nondeterministic resolutions in the grammar) is done either randomly or according to a prespecified measure which allows probablistic control over how often different options for resolution in the grammar are selected.

When Insertion resolves to InsertionCode, the further resolution will either be to decoy code for the cascade fail system (DecoyCode) or to a CFSInsert. The decoy code, as described above, is code which has no important effect on the sensitive code or the cascade failure system but which may hide the existence, location, or purpose of the cascade failure system code or amplify its effects.

A code failure system insert (CFSInsert) consists of some number of repetitions n of CascadeChecks. CascadeChecks are the element of cascade failure system code which checks an authorization (AuthorizationCheck) and performs a number of cascade triggers (CascadeTrigger) if the authorization is failed. The number n of repetitions of CascadeChecks and the number m of repetitions of CascadeTriggers m in one embodiment is randomly selected for each resolution of CFSInsert and CascadeCheck to be between one and five. The CascadeTrigger, as described above, resolves into one of a number of code changes which triggers more system failures and failed authorization checks.

In another embodiment, any of the grammar elements can be resolved from zero to several times for each insertion location. Thus, the amount or nature of the code inserted at any given site is essentially impossible to predict by an adversary analyzing the code.

Example Process of Including a Cascade Fail System

Figure 3:
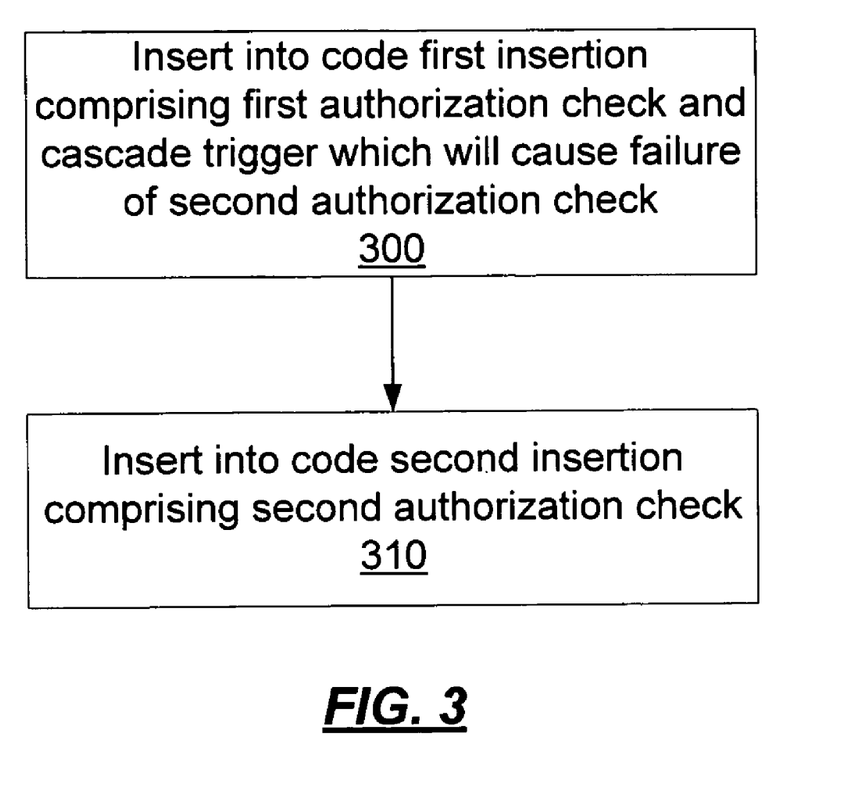
FIG. 3 is a flow diagram of inserting cascade fail system code into sensitive code in order to implement a cascading failure according to one embodiment of the invention.

FIG. 3 shows an example process of inserting cascade fail system code into sensitive code in order to implement a cascading failure. First, in step 300, a first insertion including an authorization check and a first cascade trigger is inserted into the code. The authorization check detects whether an unauthorized action has occurred. The cascade trigger, if an unauthorized action has occurred, changes a state of the computing environment in which the code is running in a way which will trigger a failure in a second authorization check. In step 310, a second insertion is placed into the code. The second insertion includes the second authorization check. In one embodiment, the second insertion includes a second cascade trigger which, if the second authorization check fails (e.g. because the first cascade trigger has been run, or because an intrusion is otherwise detected) will run to change a state of the computing environment in order to trigger a failure in a third authorization check. In one embodiment, a number of such authorization checks with associated cascade triggers are included in the sensitive code.

Figure 4:
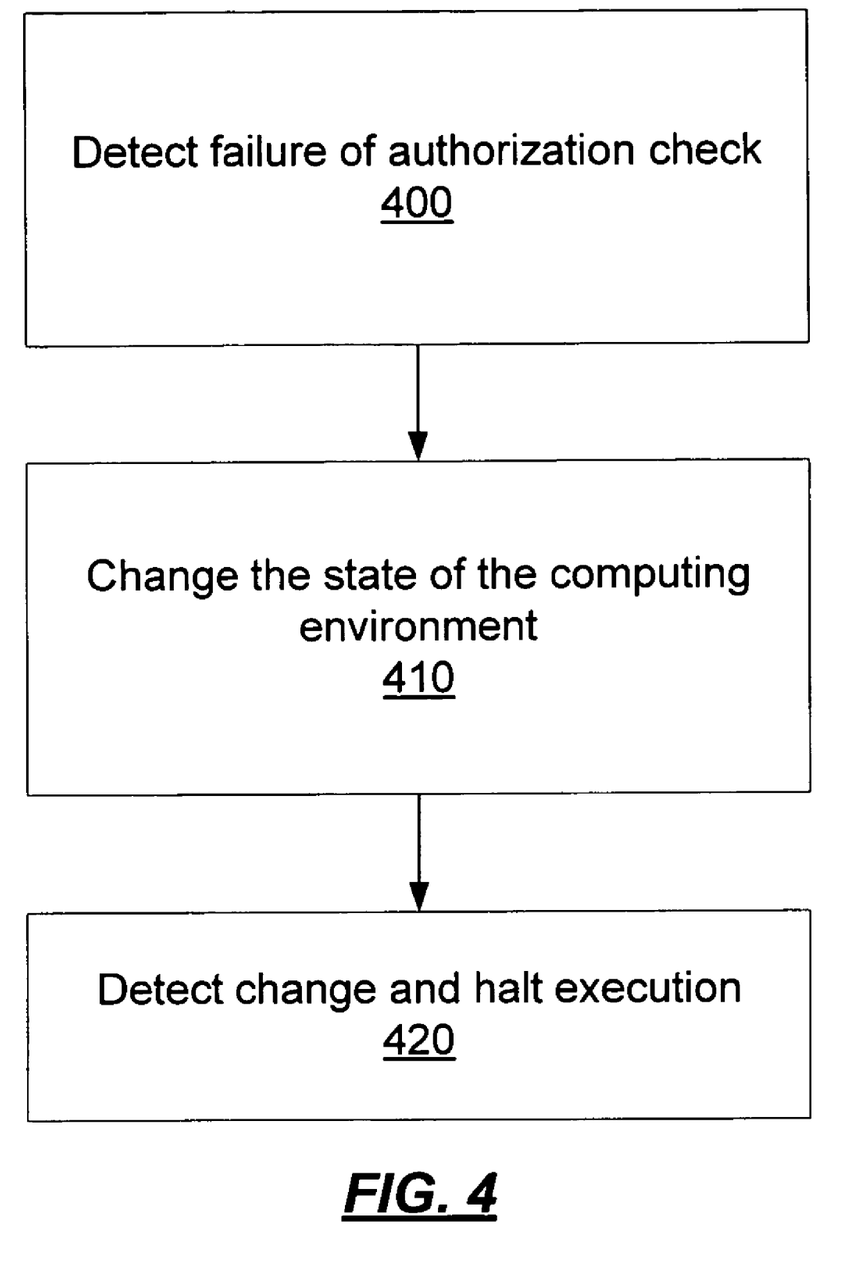
FIG. 4 is a flow diagram of protecting sensitive code executing in a computing environment.

Thus, when the cascade failure system is active, it protects sensitive code, as shown in FIG. 4. FIG. 4 shows an example process of protecting sensitive code executing in a computing environment. FIG. 4 describes the failure cascade including its eventual conclusion in improper execution of sensitive code. In step 400, an unauthorized action occurring in the computing environment or an emulation of such an unauthorized action (as initiated by the cascade failure system) is detected. The detection of an unauthorized action occurs when an authorization check is failed, either due directly to an adversarial tampering or due to a prior cascade trigger. When this occurs, as shown in step 410, the state of the computing environment is changed in a way which emulates additional unauthorized behavior. For example, a page of memory may be overwritten, or a page which was set to be decrypted is not decrypted. In step 420, the change is detected, and normal execution of the code ceases. Step 420 may occur in an authorization check or may occur in the normal execution of the sensitive code. For example, if the sensitive code requires a page of memory which has been overwritten or not decrypted due to a prior cascade trigger, this may cause a halt in the normal functioning of the code. In one embodiment, cascade fail system code may include authorization checks which directly cause a halt to the execution of the code as a failure trigger.

Step 400 may occur after a chain of prior cascade triggers, each of which was prompted by a failed authorization check, and other cascade triggers may occur in between step 400 and step 420.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of protecting sensitive code, comprising:
    inserting into said sensitive code a first insertion comprising a first authorization check which, when said sensitive code is executing in a computing environment, detects whether an unauthorized action is occurring; and a first cascade trigger which, upon said detection of an unauthorized action, changes a first state of said computing environment in a way detectable by a second authorization check;
    inserting into said sensitive code a second insertion comprising said second authorization check; and a second cascade trigger, which upon detection of said changed first state, generates one of a) a stack failure and b) a heap failure; and
    inserting into said sensitive code a third insertion comprising decoy code, wherein said decoy code changes said first state of said computing environment in a way which will not cause any of a group of authorization checks comprising said first authorization check and said second authorization check to detect an unauthorized action if, before said decoy code changes, no authorization check from said group would have detected said unauthorized action.

2. The method of claim 1, where said first authorization check further detects a situation selected from among a group consisting of the following: an unauthorized change to memory in said computing environment, and an authorized attempt to examine said sensitive code.

3. A method of protecting sensitive code, comprising inserting additional code into said sensitive code, said additional code comprising at least two instances of a first insertion and a second insertion according to the method of claim 1.

4. The method of claim 3, where the content of said additional code comprises authorization checks and state changing code selected randomly from a set of possible authorization checks and possible state changing code.

5. The method of claim 3, where said first insertions and said second insertions are inserted into randomly selected locations in said sensitive code.

6. A computer-readable storage medium having stored thereon, a program module for executing a sensitive task, said program module comprising:
    a sensitive code containing one or more sensitive code portions for performing said sensitive task, said sensitive code comprising an obfuscation;
    a first protective insertion comprising a first authorization check which, when said sensitive code is executing in a computing environment, detects whether said obfuscation has been corrected before execution of said sensitive code, failing which, said sensitive code is deliberately executed in an improper manner, wherein said first protective insertion a cascade trigger which, upon detection of a failure of said first authorization check, changes a first state of said computing environment in a way detectable by a second authorization check; and
    a second protective insertion comprising decoy code, wherein said decoy code changes a first state of said computing environment in a way which will not cause any of a group of authorization checks comprising said first authorization check and said second authorization check to detect an unauthorized action if, before said decoy code changes, no authorization check from said group would have detected said unauthorized action.

7. The program module of claim 6, where said change to said first state of said computing environment triggers a failure in said second authorization check.

8. The program module of claim 6, where said execution of said sensitive code in said improper manner causes said execution of sensitive code to halt.

9. The program module of claim 6, where said first authorization check further detects a situation selected from among a group consisting of the following: an unauthorized change to memory in said computing environment, and an unauthorized attempt to examine said sensitive code.

* * * * *